(12) United States Patent
Van De Sluis et al.

(10) Patent No.: US 8,258,708 B2
(45) Date of Patent: Sep. 4, 2012

(54) INTERACTIVE LIGHT SYSTEM FOR A CLOTHING RACK

(75) Inventors: Bartel Marinus Van De Sluis, Eindhoven (NL); Theodorus Johannes Petrus Van Den Biggelaar, Veldhoven (NL); Anthonie Hendrik Bergman, Neunen (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 378 days.

(21) Appl. No.: 12/599,334

(22) PCT Filed: May 6, 2008

(86) PCT No.: PCT/IB2008/051747
§ 371 (c)(1),
(2), (4) Date: Nov. 9, 2009

(87) PCT Pub. No.: WO2008/139364
PCT Pub. Date: Nov. 20, 2008

(65) Prior Publication Data
US 2010/0301767 A1    Dec. 2, 2010

(30) Foreign Application Priority Data
May 10, 2007    (EP) .................................... 07107958

(51) Int. Cl.
*H05B 37/00*    (2006.01)

(52) U.S. Cl. ..................... 315/149; 315/158; 315/159

(58) Field of Classification Search .................. 315/149, 315/155, 159, 157, 158, 156; 362/276
See application file for complete search history.

(56) References Cited

U.S. PATENT DOCUMENTS

| 4,873,469 A | 10/1989 | Young et al. |
| 6,786,793 B1 | 9/2004 | Wang |
| 2006/0044800 A1* | 3/2006 | Reime ............................ 362/276 |
| 2008/0012722 A1* | 1/2008 | Moseley .................... 340/825.69 |
| 2008/0136356 A1* | 6/2008 | Zampini et al. ................ 315/308 |

FOREIGN PATENT DOCUMENTS

CA    1253268 A1    4/1989

* cited by examiner

*Primary Examiner* — David Hung Vu
(74) *Attorney, Agent, or Firm* — Mark L. Beloborodov

(57) ABSTRACT

The invention relates to a an interactive light system for a clothing rack, particularly for creating attraction lighting for clothes hanging on a rail of the clothing rack. A basic idea of the invention to control light sources integrated in the clothing rack depending on the detection of an object such as a person. This allows implementing a kind of an interactive lighting function, and furthermore attraction functions for shoppers. An interactive light system (10) according to an embodiment of the invention for a clothing rack (12) comprises one or more light sources (14) integrated in the clothing rack (12), one or more sensors (16, 18, 20) adapted to detect an object (22), and a control unit (24) which receives signals (26) from the sensors (16, 18, 20) and is adapted to evaluate the received signals (26) and to generate control signals (28) for the light sources (14) controlling the lighting depending on the evaluation.

8 Claims, 5 Drawing Sheets

INTERACTIVE LIGHT SYSTEM FOR A CLOTHING RACK

The invention relates to a an interactive light system for a clothing rack, particularly for creating attraction lighting for clothes hanging on a rail of the clothing rack.

In shops it is important to have sufficient light on the products, but at the same time it is important to have an appropriate shop atmosphere. Especially in higher segment shops, store managers often prefer lower levels of lighting since this looks more elegant and creates an exclusive atmosphere. As a result, accent lighting is needed in order to illuminate the goods properly. A specific problem for shoppers is browsing through clothes hanging on the rail of a clothing rack. Often, like mentioned above, there is simply no sufficient light and sometimes the shopper sheds a shadow exactly where she or he is looking, because the light is blocked by herself or himself.

Therefore, it is an object of the present invention to provide an interactive light system for a clothing rack which is able to create sufficient lighting for seeing characteristics of objects for example clothing hanging on a clothing rail or a curtain rail of the clothing rack.

The object is achieved by the independent claim(s). Further embodiments are shown by the dependent claim(s).

A basic idea of the invention to control light sources integrated in the clothing rack depending on the detection of an object such as a person. This allows implementing a kind of an interactive lighting function, and furthermore attraction functions for shoppers. Therefore, the invention is particularly suitable for shops since shops often want to bring certain garments under shoppers' attention in an elegant and subtle way. According to embodiments of the invention, lighting in a clothing rack can be made dynamic in order to attract people's attention from a distance. Once someone's attention is attracted and a person comes closer to the clothing rack the lighting should ideally become less dynamic not to be too distracting and annoying. When the user is actually watching and browsing the garments in the clothing rack, the lighting could become static at a high light intensity level, for example.

According to an embodiment of the invention, an interactive light system for a clothing rack is provided, wherein the system comprises one or more light sources integrated in the clothing rack,
one or more sensors adapted to detect an object, and
a control unit which receives signals from the sensors and is adapted to evaluate the received signals and to generate control signals for the light sources controlling the lighting depending on the evaluation.

This interactive light system allows controlling the lighting created by the light sources of the system depending on the detection of an object such as a person standing before the clothing rack. The control unit may be implemented for example with a microcontroller configured by specific software to perform the specified functionality.

According to an embodiment of the invention, the control unit may be further adapted to control the dynamic of the lighting of the light sources depending on the evaluation of the signals received from the sensors. The control of the lighting dynamic allows implementing user attraction functionality.

According to a further embodiment of the invention, the control of the dynamic of the lighting of the light sources may depend on an object detected before the clothing rack. For example, when the system detects a person approaching the clothing rack, the system may switch the light sources into a specific lighting mode in order to attract the person.

Furthermore, the control of the dynamic of the lighting of the light sources may depend on the distance between an object detected before the clothing rack and the clothing rack according to a further embodiment of the invention. For example, the dynamic may be controlled such that, when a person approaches the clothing rack, the system control changes the lighting depending on the detected distance, for example changes the lighting from an attraction lighting such as blinking to a more static lighting when the person comes more close to the clothing rack.

According to an embodiment of the invention, the control of the dynamic of the lighting of the light sources may comprise switching the lighting from one mode in another mode. For example, when a person is detected, the lighting may first switched into an attraction mode such as blinking. Then, when the distance between the person and the clothing rack is below a predetermined threshold, the lighting may be switched into an inspection mode with a more static lighting at a higher intensity in order to allow the person to inspect the clothes hanging in the clothing rack.

The switching of the lighting from one mode in another mode may comprise generating ramped saw tooth signals as control signals for the light sources in order to smoothly switch the generated light from pulsating light to static light, according to an embodiment of the invention.

Furthermore, the generating of ramped saw tooth signals as control signals for the light sources may comprise varying the pulsating intensity of the pulsating light depending on the distance between an object detected before the clothing rack and the clothing rack.

The one or more sensors may comprise one or more human presence detection sensor and a human distance detection sensor, for example infrared or ultrasonic sensors. An infrared sensor is suitable to reliably detect the presence of a person in the area supervised by the sensor. An ultrasonic sensor is suitable to detect the distance between an object such as person and the sensor itself, for example by determining the Doppler shift of pulses sent out by the sensor and reflected by the object.

The one or more sensors may be located at the clothing rack or integrated in the clothing rack. For example, a sensor may be integrated in the top of the clothing rack in order to reliably detect persons standing in front of the rack or approaching the rack. Also, one or more sensors may be integrated in a clothing rail of the rack in order to offer a sufficient lighting for shoppers inspecting the clothes hanging on the rail. Also, a sensor may be fixed at a wall near the clothing rack and adapted so that it can reliably detect persons.

According to an embodiment of the invention, the one or more sensors may be adapted to be connected to the clothing rack. For example, a sensor may be implemented as a kind of "click-on" sensor which may be simply connected with the clothing rack by clicking it on a connector of the clothing rack. This allows an easy and quick replacement of sensors.

The light system may comprise according to an embodiment of the invention a switch integrated in the clothing rack and provided for enabling the generation of control signals for the light sources controlling the lighting depending on the evaluation. Often, in shops only one or two clothing racks should have the interactive functionality according to the invention in order to attract shoppers to for example special offer. Thus, the switch allows enabling the interactive functionality for the clothing racks with special offers and to disable it for the other clothing racks.

The clothing rack may also comprise a network connection adapted to connect the clothing rack to a central lighting system, which comprises the one or more sensors and the control unit. Thus, the clothing rack may comprise merely the light source, while the sensor and control functionality of the system may be part of the central lighting system. For example, the lighting system may comprise an efficient computer for performing several complex lighting control functions for a larger shop and the clothing racks inside the shop.

According to a further embodiment of the invention, a method for generating control signals for light sources of a light system of the invention may be provided, wherein the method comprises receiving signals from the sensors,
evaluating the received signals, and
generating control signals for the light sources controlling the lighting depending on the evaluation.

The method may further comprise controlling the dynamic of the lighting of the light sources depending on the evaluation of the signals received from the sensors. Furthermore, the method may comprise controlling of the dynamic of the lighting of the light sources depending on an object detected before the clothing rack. Also, the method may comprise controlling of the dynamic of the lighting of the light sources depending on the distance between an object detected before the clothing rack and the clothing rack. Particularly, the controlling of the dynamic of the lighting of the light sources may comprise switching the lighting from one mode in another mode. The switching of the lighting from one mode in another mode may comprise generating ramped saw tooth signals as control signals for the light sources in order to smoothly switch the generated light from pulsating light to static light. The generating of ramped saw tooth signals as control signals for the light sources may comprise varying the pulsating intensity of the pulsating light depending on the distance between an object detected before the clothing rack and the clothing rack.

Furthermore, the invention relates to a computer program enabled to carry out the method for creating a localized light according to the invention when executed by a computer. The invention also provides a record carrier storing this computer program.

Finally, the invention relates according to an embodiment to a computer programmed to perform a method according to the invention and comprising communication means for communicating with an interactive light system according to the invention.

These and other aspects of the invention will be apparent from and elucidated with reference to the embodiment(s) described hereinafter.

The invention will be described in more detail hereinafter with reference to exemplary embodiments. However, the invention is not limited to these exemplary embodiments.

In the following, functional similar or identical elements may have the same reference numerals. Absolute values are only exemplary values and may not be understood as restrictive for the invention.

Figure 1:
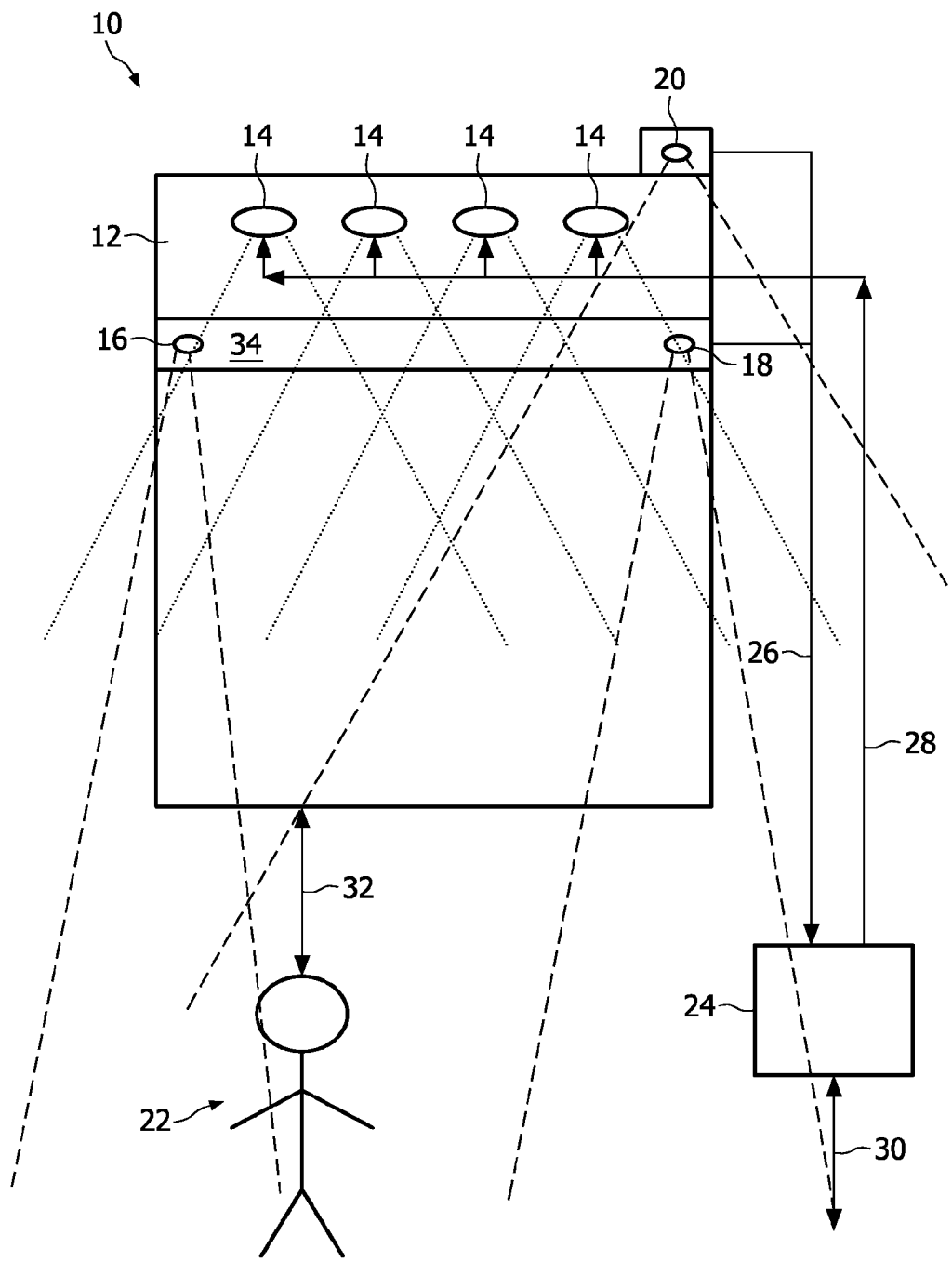
FIG. 1 shows an embodiment of an interactive light system for a clothing rack according to the invention.
Figure 2:
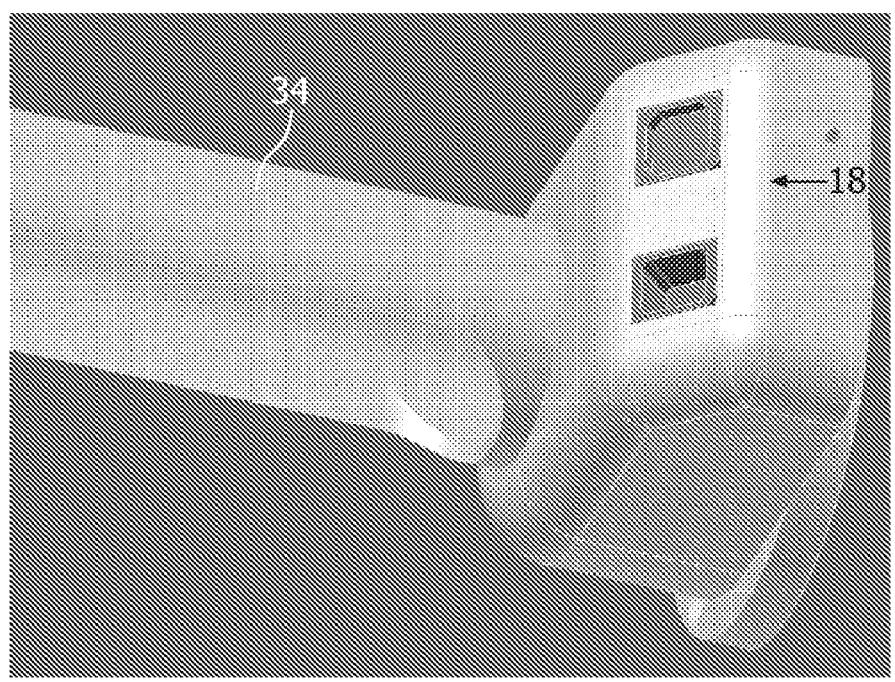
FIG. 2 is a detail view of a clothing rail with integrated sensors for a clothing rack as shown in FIG. 1.

FIG. 1 shows an interactive light system 10 for a clothing rack 12 for a shop. In the rack 12, several light sources 14 are integrated. Furthermore, the rack 12 is equipped with sensors 16, 18, and 20 which are able to detect human presence. The sensors 16 and 18 are integrated in a clothing rail 34 of the rack 12. FIG. 2 shows the sensor 18 integrated in the clothing rail 34 in detail. The system 10 further comprises a control unit 24 which receives signals 26 from the sensors 16, 18, and 20 and generates control signals 28 for the light sources 14.

The control unit 24 is a computer controlled by lighting control software. Particularly, the software is configured to detect the distance 32 between a human 22 standing before the clothing rack 12 and the rack 12 by means of the signals 26 from the sensors 16, 18, and 20 and to adjust the dynamics level of the lighting depending on detection of human presence and the measured distance 32. By doing this, the attention of people at a particular distance from the clothing rack may be attracted in an appropriate way since the dynamics level is adjusted to this distance. This mode in which user's attention is attracted with dynamic lighting will be referred to as "flirting mode". Two possible versions of this flirting mode may be implemented in the control unit 24 and are described below.

Figure 5:
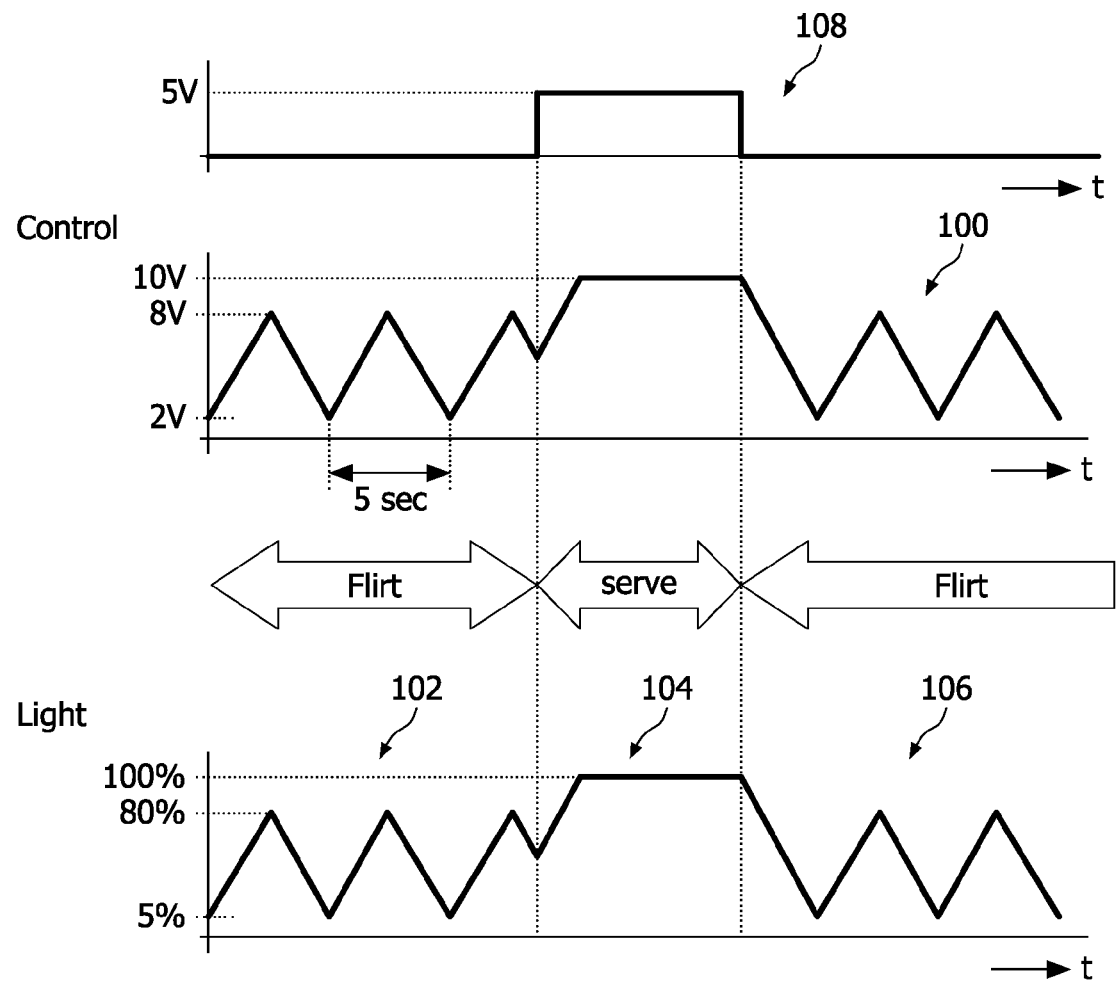
FIG. 5 shows a diagram with an exemplary course of a control signal generated by an interactive light system according to the invention.

Basic Flirting Mode:

In one embodiment of the invention, a presence sensor is used which is able to detect human presence close to the rack and this information is used by the software implemented in the control unit 24 to simply switch from "flirting mode" (dynamic light, e.g. pulsating) to "serve mode" (functional static light at high light intensity). Experiments with various lighting effects for the flirting mode showed that pulsating light is a nice way to attract attention in a subtle and aesthetically pleasing way. Pulsating lighting can be realized by means of a "ramped/saw tooth" signal, as shown in FIG. 5 and will be described later. In the switching from flirting mode to serve mode or vice versa, it may be advantageous to create smooth transitions of one mode to the other because the light should not distract or annoy the shoppers who are present in the store. Therefore, the transitions could be always executed such that the light intensity level is gradually adapted to the required level in the new mode using the same ramp.

Adaptive Flirting Mode:

In a more advanced embodiment of the invention, the dynamics level of the flirting mode lighting could be made dependent on the distance between the people detected and the clothing rack. The pulsating light, for instance, could decrease the pulsating intensity (the amplitude) while the people-rack distance decreases. The idea of this is that more dynamics are needed and suited to attract people's attention from a distance. Once people approach the rack, however, a more subtle effect may be more suited. By doing this, the dynamics in pulsation gradually fades out around an appropriate lighting intensity level once a person walks up to the clothing rack.

Preferably detection of human presence and distance are combined in one sensor (e.g. infrared, ultrasonic), which is located at the clothing rack (sensor 20), or integrated in the rack (sensors 16 and 18, integrated in the clothing rail 34).

It may be desired to restrict dynamic effects such as a flirting mode only to one or a few clothing racks in a store, not to create an overwhelming dynamic lighting effect. Therefore, clothing racks could be equipped with sensors and switches which enable a user to switch a clothing rack from "interactive" to "passive".

The clothing rack system can also be connected to the general lighting system in the store by means of a network connection 30 of the control unit 24. In this way the sensors of the general lighting system can be used to determine the presence and distance of users. This can even be used for energy savings, if no customers are present in (certain parts of) the shop, the lighting can be centrally dimmed or switched off.

Furthermore, lighting settings of the general lighting system in the store can be adapted to the mode in which the clothing rack is at any moment in order to create a stronger effect.

Figure 3:
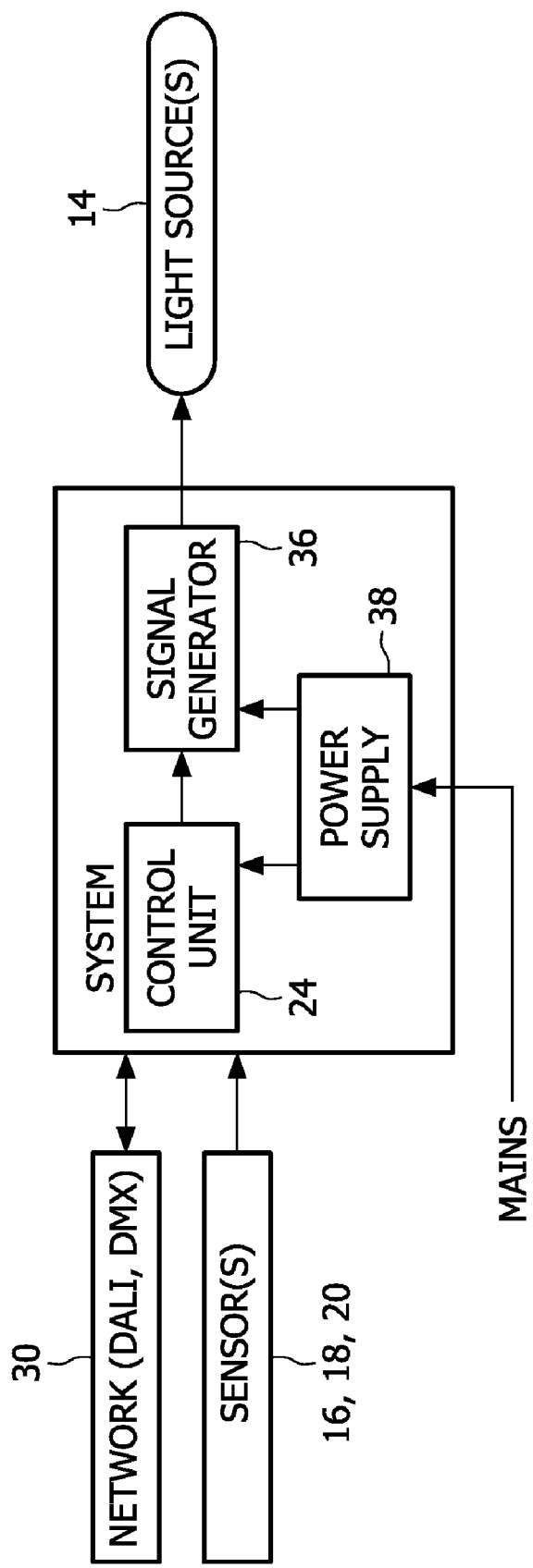
FIG. 3 shows a block diagram of an embodiment of the interactive light system according to the invention.

FIG. 3 shows a technical realization of a light system according to the invention. The network connection 30 is optional and can be used for various purposes as described above. The control unit 24 controls a signal generator 36 for generating the supply signals for the light sources 36. The control unit 24 and the signal generator 36 are supplied by a power supply unit 38 which is connected with the mains.

Figure 4:
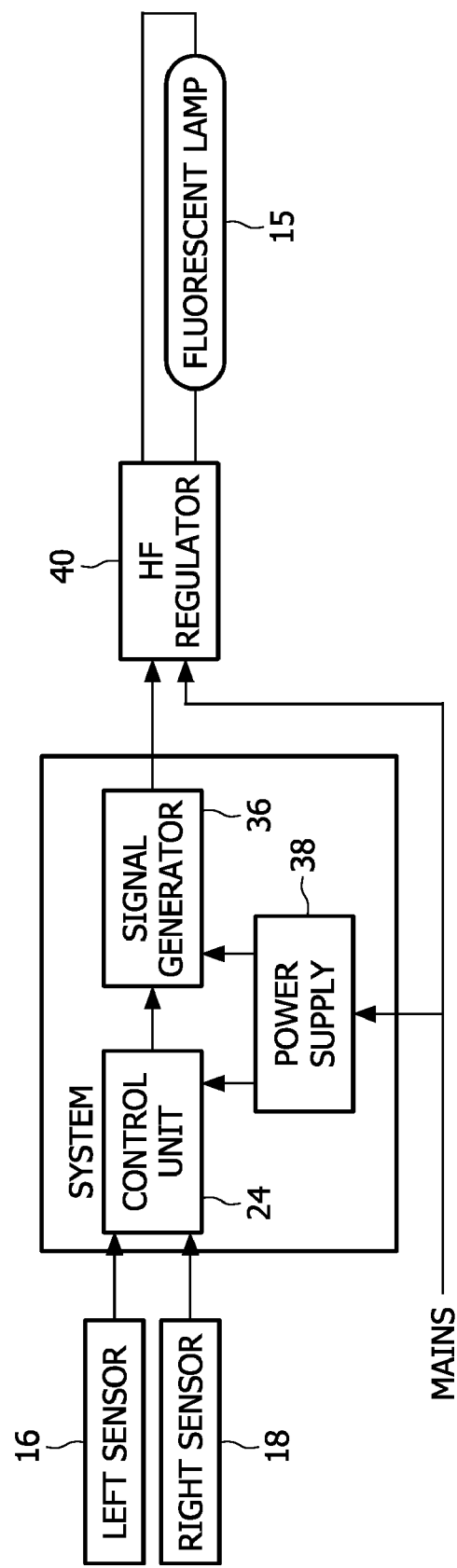
FIG. 4 shows a block diagram of another embodiment of the interactive light system according to the invention.

A further embodiment is shown in FIG. 4. In contrast to the embodiment of FIG. 3, this embodiment employs one fluorescent tube 15 integrated in the clothing rack, and two sensors 16 and 18 fixed at both ends of the clothing rail slightly directed towards the centre. In order to be able to control the lighting dynamic of the fluorescent tube 15, the system comprises a HF (High Frequency) regulator 40 switched in between the signal generator 36 and the fluorescent tube 15.

FIG. 5 shows how the combined information from the two sensors of the embodiment of FIG. 4 generates an example approach signal 108, and how this approach signal 108 could be used to generate a control signal 100 to generate a pulsating lighting effect 102 for the basic flirting mode. On the moment that human presence is detected, the lighting stops pulsating and directly but gradually (with same ramp as used when pulsating) goes to stable lighting 104 at high intensity (serve mode in FIG. 5). When human presence is no longer detected, the control signal switches back into the flirting mode with pulsating lighting 106. An advantage of this mechanism is that there is an immediate response in mode switching, but also a seamless transition from one mode to the other.

The invention has the main advantages that it implements an interactive lighting functionality in a clothing rack and allows to create lighting effects for attracting shopper's.

The functionality of the invention may be performed by hard- or software. In case of an implementation in software, a single or multiple standard microprocessors or microcontrollers may be used to process a single or multiple algorithms implementing the invention.

It should be noted that the word "comprise" does not exclude other elements or steps, and that the word "a" or "an" does not exclude a plurality. Furthermore, any reference signs in the claims shall not be construed as limiting the scope of the invention.

The invention claimed is:

1. An interactive light system for a clothing rack, the system comprising
   one or more light sources integrated in the clothing rack,
   one or more sensors configured for detecting an object and generating signals when the object is detected generally in front of the clothing rack, and
   a control unit configured for receiving and analyzing the signals from the sensors and generating control signals for a dynamic control of the light sources based, at least in part, on the signals,
   wherein the dynamic control of the light sources includes switching the light sources between a dynamic and static modes depending on the distance between the object and the clothing rack and said switching comprises generating the control signals configured to effect smooth change between pulsating and continuous light emitted by the light sources.

2. The light system of claim 1, wherein the switching comprises generating ramped saw tooth signals as control signals for the light sources.

3. The light system of claim 1, wherein the ramped saw tooth pattern is configured for varying an intensity of the pulsating depending on the distance between the object and the clothing rack.

4. The light system of claim 1, wherein the one or more sensors comprise one or more human presence detection sensor and a human distance detection sensor and wherein the one or more sensors are located at the clothing rack or integrated within the clothing rack.

5. The light system of claim 1, further comprising a switch integrated in the clothing rack for enabling the generation of control signals for the light sources.

6. The light system of any of claim 1, wherein the control unit comprises a network connection for connecting the light system to a central lighting system, which comprises the one or more sensors and the control unit.

7. A method for generating control signals for light sources of the light system of claim 1, comprising
   receiving signals from the sensors indicative of an object being detected generally in front of the clothing rack,
   evaluating the received signals,
   generating control signals for the light sources depending on the evaluation, and
   dynamically controlling the light sources depending on the evaluation of the signals received from the sensors,
   wherein the step of dynamically controlling the light sources includes steps of switching the light sources between a dynamic and static modes depending on the distance between the object and the clothing rack and said steps of switching comprise generating the control signals for the light sources in a ramped saw tooth pattern configured to smoothly change between pulsating and continuous light emitted by the light sources.

8. The method of claim 7, wherein the ramped saw tooth pattern is configured for varying an intensity of the pulsating depending on the distance between the object and the clothing rack.

* * * * *